United States Patent Office 3,163,711
Patented Dec. 29, 1964

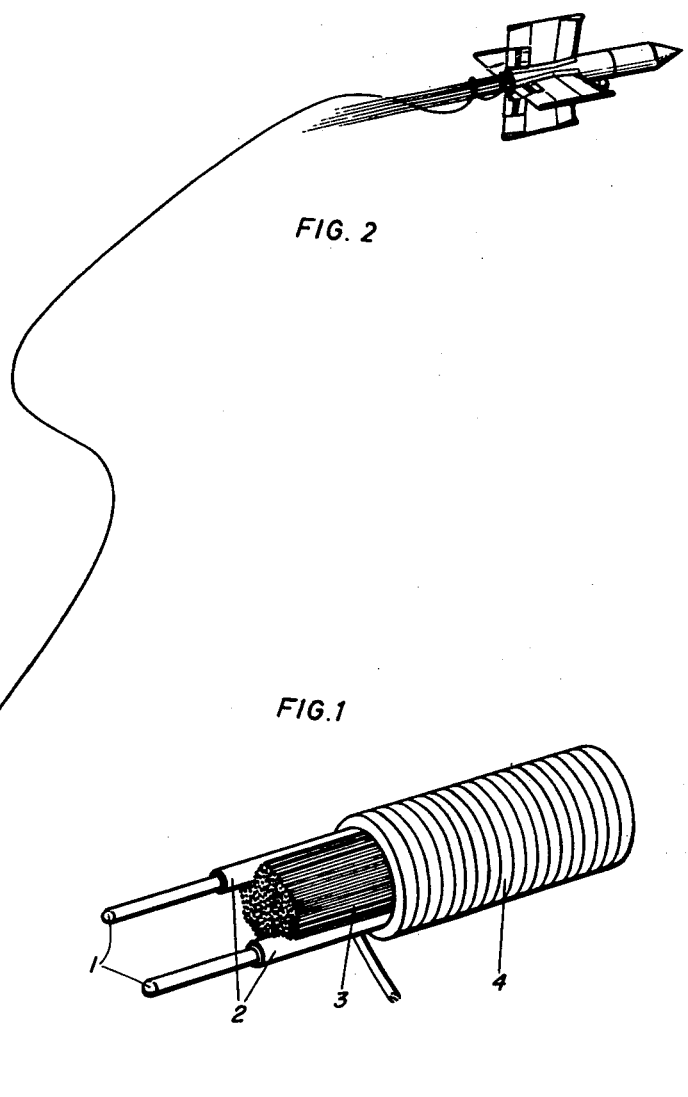

3,163,711
CABLE-CONTROLLED FLYING OBJECTS
AND CABLES THEREFOR
Werner Schindler, Ottobrunn, near Munich, Germany, assignor to Ludwig Bolkow, doing business as Bolkow-Entwicklungen K.G., Ottobrunn, Germany
Filed Aug. 19, 1959, Ser. No. 834,836
Claims priority, application Germany Aug 20, 1958
5 Claims. (Cl. 174—116)

The invention relates to control lines for connecting flying objects to a control point, and extends to flying objects incorporating such control lines.

It is known to connect flying objects such as rockets to a control point by means of two wires. During launching and flight, the wires are paid out from two supply reels within the flying object. By means of the wires, the flying object receives control signals from the control point for guiding it to a certain destination. This is shown in my prior German Patent No. 1,019,184, of April 24, 1958.

It has been found that several difficulties could not be completely overcome. The connecting lines to the control point are subjected to heavy loads, thus presenting the danger of wire failure, whereby all control over the flying object is lost. It was therefore considered that the lines in question could only be made from high tensile strength materials such as steel wire. Nevertheless, failure of even steel wires is not impossible. After paying out the wire, before it assumes a rectilinear position, it passes through a transfer zone in the form of an elongated spiral of continuously increasing pitch. In the known arrangements, a loop of the spiral is sometimes drawn tight in view of the high elasticity of the steel wire and forms a kink. However, steel wires are liable to snap easily at points where a kink has formed. Another disadvantage of using steel wires is that steel has a high electrical specific resistance. Consequently, as the flying object increases its distance from the control point, the total electrical resistance from the control point increases sharply, thus requiring a high electrical power input for the transmission of control impulses. Still further, it is not possible to transmit through the thin steel wires the electrical energy required to actuate the electric control mechanisms of the flying object, so that the flying object is itself required to carry electric current sources such as batteries, thereby unnecessarily increasing its weight. The distance between the two steel wires, which are paid out separately, is an undefined quantity, i.e., at one moment the two wires may be close together and the next moment further apart. Accordingly, the capacity of the connecting line is undefined which, in turn, causes unallowable deformations of the transmitted impulses.

According to the invention, it is intended to connect a flying object to a control point by a line which avoids the above-mentioned disadvantages. Breaks or kink formations in the connection are to be substantially eliminated. The electrical characteristics of the connection are to remain constant during flight of the flying body. Apart from good electrical properties, high tensile strength and high flexibility, the connection should also be of low weight so that the flying object is not unnecessarily loaded.

According to the invention, the connecting line comprises at least two insulated wires of metal, preferably copper, extending parallel to one another at a spacing, a larger number of yarns extending parallel to the wires and made from natural silk and/or plastics and/or glass, and a tightly wound helical coil or sheath around the wires and yarns, the sheath being pretensioned and comprising natural silk or synthetic yarns.

The two parallel copper wires are preferably insulated with lacquer. That portion of the connecting line which is paid out first from the supply reel may have a larger cross-section than the portion paid out later, in that the first portion is provided with a larger number of yarns.

A preferred form of the invention is shown in the accompanying drawings, in which:

FIG. 1 is a pictorial view of the connecting line according to the invention, and FIG. 2 is a diagrammatic view of the connection between a flying object and a control point by means of a line according to the invention.

As shown in FIG. 1, the connecting line or cable comprises two spaced parallel copper wires 1. In view of the high conductance of copper, the diameter of the wires may be quite small, for example 0.05 to 0.3 mm., preferably 0.1 mm. The copper wires 1 have an insulating covering 2, preferably of lacquer. A larger number of natural silk yarns, forming a tensile member 3 are arranged parallel to the wires 1. Instead of silk yarns, plastics or glass fibres may be used. On the other hand, materials such as cotton fibres which are frequently used in cable making are less suitable. The natural silk insert 3 may comprise 4 plies of 12 x 20/22 denier yarn. The tensile member has a tensile strength higher than the wires 1 and is less extensible than these. The wires 1 and yarns 3 are held together by a winding 4 which may likewise be of 6-ply, 20/22 denier yarn. The total diameter of the line amounts to about 0.43 mm. Despite such small diameter, a tensile strength of about 4.5 kg. can be obtained. The winding 4, like the tensile member, has a higher tensile strength than the copper wires and has also a higher flexibility than the wires. Preferably the material for the winding is the same as used for the tensile member.

It is particularly important that the copper wires 1 are parallel, i.e., not twisted. It is also important that the yarns 3 lie free, i.e., not stuck to one another or to the wires 1. Further, it is very important that the coil 4 is taut. The yarns 4 should therefore be wound around the assembly of wires 1 and yarns 3 under a slight pre-tension. In this way the tensile forces acting on the line are frictionally transmitted to the silk yarns 3, to which the line owes its high tensile strength.

The line according to the invention has a lower specific weight and higher wind resistance than, for example, known steel wires. The higher air resistance facilitates the transition of the paid out line from its spiral form, as shown diagrammatically in FIG. 2. In this connection, it is particularly advantageous if the portion of the line first paid out from the supply reel has a larger diameter by containing more yarns than the portion paid out later.

Experience has shown that the line according to the invention can be paid out without forming kinks. It is thus possible to wind the line in again on the land after firing or to continue to use it as an auxiliary information connection. Hence, by firing flying objects having no explosive charge, telephone or information connections may be established.

With the line according to the invention, high pay-out speeds can be used. By sheathing the line, a very good abrasion resistance is also obtained.

I claim:

1. A control line for connecting a comparatively fast moving flying object and a control point with each other, comprising at least two wires of high electrical conductivity and low weight per length unit, said wires extending in spaced and substantially parallel relationship, a plurality of filaments extending parallel to each other and to said wires and forming a tensile member, said filaments being made of an insulating material and having a tensile strength higher than said wires and being less extensible than said wires, a helically wound coil, said coil surrounding commonly said wires and said filaments in a tight manner so that said filaments and said wires are in frictional engagement with each other, said coil having a higher tensile strength and a higher flexibility than said wires.

2. A control line according to claim 1, wherein the material of said filaments and said coil is natural silk.

3. A control line according to claim 1, wherein the material of said filaments and said coil is glass fiber.

4. A control line according to claim 1, wherein said filaments and said coil are formed of the same material.

5. A control line according to claim 1, in which the material of the wires is copper.

References Cited in the file of this patent

UNITED STATES PATENTS

| 292,539 | Cowles | Jan. 29, 1884 |
| 360,567 | Dunham | Apr. 5, 1887 |
| 1,769,203 | Buckley | July 1, 1930 |
| 2,463,590 | Arutunoff | Mar. 8, 1949 |

OTHER REFERENCES

Rockets and Guided Missiles, Humphries, 1956; Macmillan Co., N.Y., p. 138.